United States Patent
Grossman et al.

(10) Patent No.: US 9,430,518 B2
(45) Date of Patent: *Aug. 30, 2016

(54) SPIRITUAL RESEARCH SYSTEM AND METHOD

(71) Applicants: Andrew Grossman, Hopkins, MN (US); Kenneth F. Krutsch, Minnetonka, MN (US); Richard Monson-Haefel, Edina, MN (US); Clayton Darwin, Comer, GA (US)

(72) Inventors: Andrew Grossman, Hopkins, MN (US); Kenneth F. Krutsch, Minnetonka, MN (US); Richard Monson-Haefel, Edina, MN (US); Clayton Darwin, Comer, GA (US)

(73) Assignee: Ambient Consulting, LLC, Minneapolis, MN (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/833,340

(22) Filed: Mar. 15, 2013

(65) Prior Publication Data

US 2014/0279924 A1    Sep. 18, 2014

Related U.S. Application Data

(63) Continuation-in-part of application No. 13/832,249, filed on Mar. 15, 2013.

(51) Int. Cl.
*G06F 17/00* (2006.01)
*G06F 17/30* (2006.01)

(52) U.S. Cl.
CPC ... *G06F 17/30386* (2013.01); *G06F 17/30011* (2013.01); *G06F 17/30634* (2013.01)

(58) Field of Classification Search
CPC .......... G06F 17/30386; G06F 17/30011; G06F 17/30634
USPC .................... 707/661, 722, 758
See application file for complete search history.

(56) References Cited

U.S. PATENT DOCUMENTS

| | | | |
|---|---|---|---|
| 7,984,380 B2 | 7/2011 | Mindrum | |
| 8,323,027 B2 | 12/2012 | George | |
| 2002/0004792 A1* | 1/2002 | Busa | G06F 17/2715 706/50 |
| 2002/0103876 A1* | 8/2002 | Chatani | G06F 17/30864 709/217 |
| 2002/0168664 A1* | 11/2002 | Murray | G06F 19/28 435/6.14 |

(Continued)

OTHER PUBLICATIONS

Open Bible, Crossway Bible, Good News Publishers, retrieving from Internet, 2001.*

(Continued)

*Primary Examiner* — Phong Nguyen
(74) *Attorney, Agent, or Firm* — Beck Tysver Evans, PLLC (57) ABSTRACT

A computerized system and method are presented that provide access to a research archive for researching fundamental texts of a variety of spiritual and religious domains. The research archive is oriented around ideas having snippets from the fundamental texts. Each idea is associated with a single life issue tag and a religious or spiritual domain. Each idea is further associated with a fixed number of commentaries that comment on the snippet from the point of view of the religious domain and its relationship to the associated life issue tag. The fixed number of commentaries are each written with respect to a particular role.

15 Claims, 10 Drawing Sheets

(56) References Cited

U.S. PATENT DOCUMENTS

| | | | |
|---|---|---|---|
| 2004/0083092 A1* | 4/2004 | Valles | G06F 17/2785 704/9 |
| 2005/0144042 A1* | 6/2005 | Joffe | G06Q 50/22 705/2 |
| 2005/0287505 A1 | 12/2005 | George | |
| 2006/0242309 A1* | 10/2006 | Damick | G06F 17/30699 709/229 |
| 2007/0088695 A1* | 4/2007 | Bleyendaal | G06F 17/30696 707/E17.082 |
| 2008/0208606 A1* | 8/2008 | Allsop | G06F 17/30867 705/1.1 |
| 2009/0019310 A1* | 1/2009 | Nastacio | G06F 11/0709 714/26 |
| 2009/0100369 A1 | 4/2009 | Mindrum | |
| 2009/0230668 A1 | 9/2009 | Andres | |
| 2009/0240671 A1* | 9/2009 | Torres | G06F 17/30011 707/999.004 |
| 2009/0248399 A1* | 10/2009 | Au | G06F 17/27 704/9 |
| 2009/0299988 A1* | 12/2009 | Hamilton, II | G06F 17/30702 707/999.005 |
| 2009/0319338 A1 | 12/2009 | Parks et al. | |
| 2010/0101004 A1 | 4/2010 | Ragsdale, III | |
| 2010/0114937 A1 | 5/2010 | Hawthorne et al. | |
| 2010/0198627 A1* | 8/2010 | Moed | G06Q 10/02 705/5 |
| 2011/0055713 A1 | 3/2011 | Gruenewald | |
| 2011/0065079 A1 | 3/2011 | Boswell | |
| 2011/0258552 A1 | 10/2011 | White | |
| 2013/0171610 A1 | 7/2013 | Andres | |
| 2013/0238729 A1* | 9/2013 | Holzman | H04L 51/066 709/206 |
| 2013/0332952 A1 | 12/2013 | Anandpura et al. | |

OTHER PUBLICATIONS

Nov. 30, 2015 USPTO Office Action (U.S. Appl. No. 13/832,249).
Feb. 29, 2016 USPTO Office Action (U.S. Appl. No. 13/834,065).
Jul. 14, 2015 USPTO Office Action (U.S. Appl. No. 13/834,065).
Afterlife, Spiritual Science Research Foundation, Bridging the Known and Unknown Worlds, 2012.
Causes of Problems in Life, Spiritual Science Research Foundation, Life, Death and Afterlife, 2012.

* cited by examiner

SPIRITUAL RESEARCH SYSTEM AND METHOD

CROSS-REFERENCE TO RELATED APPLICATION

This application is a continuation-in-part of U.S. patent application, Ser. No. 13/832,249, filed Mar. 15, 2013, which is hereby incorporated by reference in its entirety.

FIELD OF THE INVENTION

The present application relates to the field of computerized systems that automate the process of spiritual research.

SUMMARY

An embodiment of the present invention provides one or more server computer systems that provide access to a research archive for researching fundamental texts of a variety of spiritual and religious domains.

DETAILED DESCRIPTION

System Overview

Figure 1:
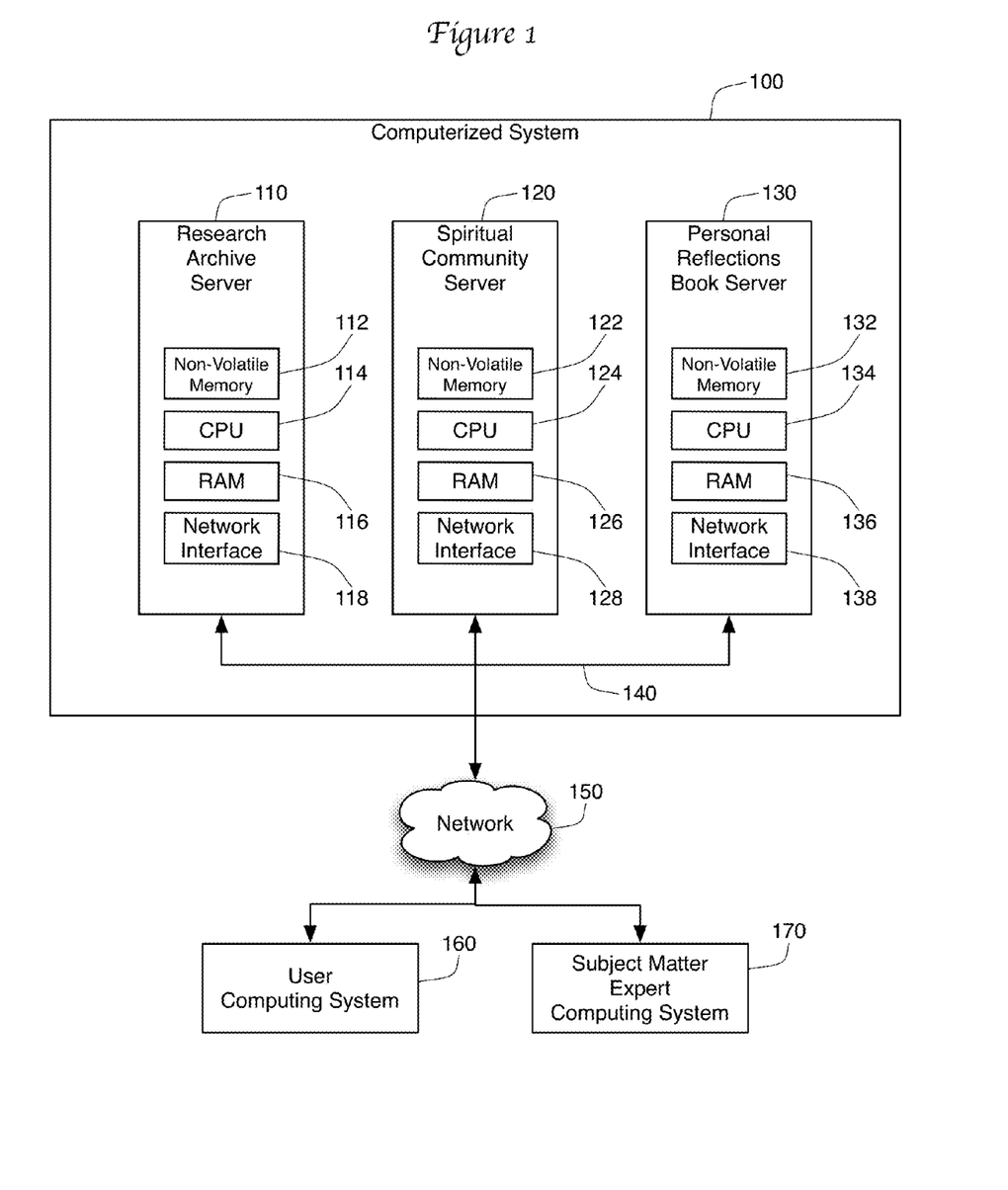
FIG. 1 is a schematic diagram showing a server capable of implementing a research archive of the present invention in the context of a larger system.

FIG. 1 shows the major elements of a system 100 in which the present invention can be used. In the embodiment shown in FIG. 1, the computerized system 100 utilizes three separate server systems, namely an archive server 110, a spiritual community server 120, and a personal reflections book server 130. Each of these servers 110, 120, 130 uses a set of software instructions or interfaces stored on a non-volatile, non-transitory, computer readable medium 112, 122, 132, respectively, such as a hard drive or flash memory device. A programmable digital processor 114, 124, 134, such as a general purpose CPU manufactured by Intel Corporation (Mountain View, Calif.) or Advanced Micro Devices, Inc. (Sunnyvale, Calif.), accesses and performs the software. To improve efficiency, the processors 114, 124, 134 may load software stored in memory 112, 122, 132 into faster, but volatile RAM 116, 126, 136. Data operated upon by the software can also be stored in non-volatile memory 112, 122, 132 and retrieved into RAM 116, 126, 136 for analysis, recording, and reporting. The software typically includes operating system software, such as LINUX (available from multiple companies under open source licensing terms) or WINDOWS (available from Microsoft Corporation of Redmond, Wash.).

Each of the server systems 110, 120, 130 further includes a network interface 118, 128, 138 to communicate with other computerized devices across the digital data network 150. In one embodiment, the network 150 is wide area network such as the Internet or a TCP/IP-based Intranet, and the network interfaces 118, 128, 138 each include TCP/IP protocol stacks for communicating over the network 150. The network interfaces 118, 128, 138 may connect to the network 150 wirelessly or through a physical wired connection. The network interfaces 118, 128, 138 can also be used to provide communication between the servers 110, 120, 130, such as over a local area network 140.

The computerized system 100 is shown in FIG. 1 as three separate server systems 110, 120, 130 to emphasize the distinct services provided by each of these systems 110, 120, 130. Each of these separate server systems 110, 120, 130 can be implemented on a single computer with a single processor 114, 124, 134. Alternatively, each server system 110, 120, 130 could also implemented using a network of computers all operating according to the instructions of the software. In fact, the entire system 100 could easily be implemented on a single computer system using one or more processors.

The computerized system 100 provides access to data on the servers 110, 120, 130 over the network 150 to a user computer system 160. The user computer system 160 could be similar in construction to the server systems 110, 120, 130 that make up system 100, utilizing a general-purpose processor such as those provided by Intel Corporation or Advanced Micro Devices. Alternatively, the user computer system 160 could be a portable computing device such as a tablet computer or smart phone. These kinds of devices generally use specific operating systems designed for mobile devices, such as iOS from Apple Inc. (Cupertino, Calif.) or ANDROID OS from Google Inc. (Menlo Park, Calif.), and also frequently use mobile specific processors, such as those designed by ARM Holdings (Cambridge, UK). The user computer system 160 allows a user to access and update the data found on the servers 110, 120, 130.

In addition, the computerized system 100 provides access to the data on the servers 110, 120, 130 to a subject matter expert (or "SME") computing system 170. Like the user computer system 160, the SME computing system 170 could be a general-purpose computer or a mobile device. Also like the user computer system 160, the SME computing system 170 accesses and updates the data found on the servers 110, 120, 130. The SME computing system 170 differs from the user computing system 160 in the type of access provided to the data and also in the type of tools that are made available to experts as they assist with the development of the data. The SME computing system 170 is usable only by experts in the religious and spiritual subject matters that are found in the servers 110, 120, 130. The system 100 grants these experts the ability to add and change data in the system 100 that is not alterable by other users.

Each server system 110, 120, 130 manages a database and provides interfaces to the database to one or more user computing systems 160 over the network 150. The archive server 110 contains data about spiritual texts and life issues. This data is sometimes referred to herein as the "research archive." The spiritual texts are taken from a variety of spiritual and religious beliefs referred to herein as domains. One of the primary data elements maintained by the archive server 110 is an "idea." Each idea contains or refers to a snippet or quotation from a spiritual text that is considered a foundational text for one of the domains of the research archive. Each idea also contains or refers to a set number of commentaries on the snippet. The commentaries are written from the point of view of a particular domain, and each commentary is written in the context of a particular approach to that domain. Furthermore, each idea approaches the snippet of text in the context of a particular life issue. Life issues are organized as tags within a life issue tag hierarchy maintained by the archive. This is described in more detail below in connection with FIGS. 2 and 3.

The spiritual community server 120 provides a social networking space to the user computer 160 organized around community spaces. Community spaces may have closed memberships to outsiders, creating social networking areas that are open only to a defined constituency. Examples include clergy spaces that are open only to clergy of a particular denomination and congregational spaces open only to known members of a spiritual congregation. Members of these communities use the spiritual community server 120 to engage with each other over spiritual issues.

The personal reflections book server 130 provides the user computing device 160 with the resources necessary to plan, document, and contemplate a personal life journey. The personal reflections book server 130 allows a user to record thoughts and actions, and plan for future actions and deeds. The personal reflections book server 130 is deeply integrated into the archive provided by the archive server 110, allowing research into the archive to place meaning on the events and beliefs recorded through the personal reflections book server 130.

The computer system 100 monitors users in all three aspects of the system 100. This allows the system 100 to track behavior and movement within the system, and to present suggestions for consideration by the users. A user struggling with a life issue using the personal reflections book server 130 could be identified by the system 100, and related ideas from the archive server 110 could be suggested to the user. Alternatively, the system could recommend conversations or other interactions maintained by the spiritual community server 120 that are related to that struggle. Paths taken by a user through the system 100 can be recorded, and outcomes of various struggles, decisions, and life events could be determined. This data could be aggregated to remove personally identifying information and then shared with other users, researchers, and educational and spiritual institutions. More information about the spiritual community server 120 and the personal reflections book server 130 can be found in the parent patent application incorporated above.

Archive Structure

Figure 2:
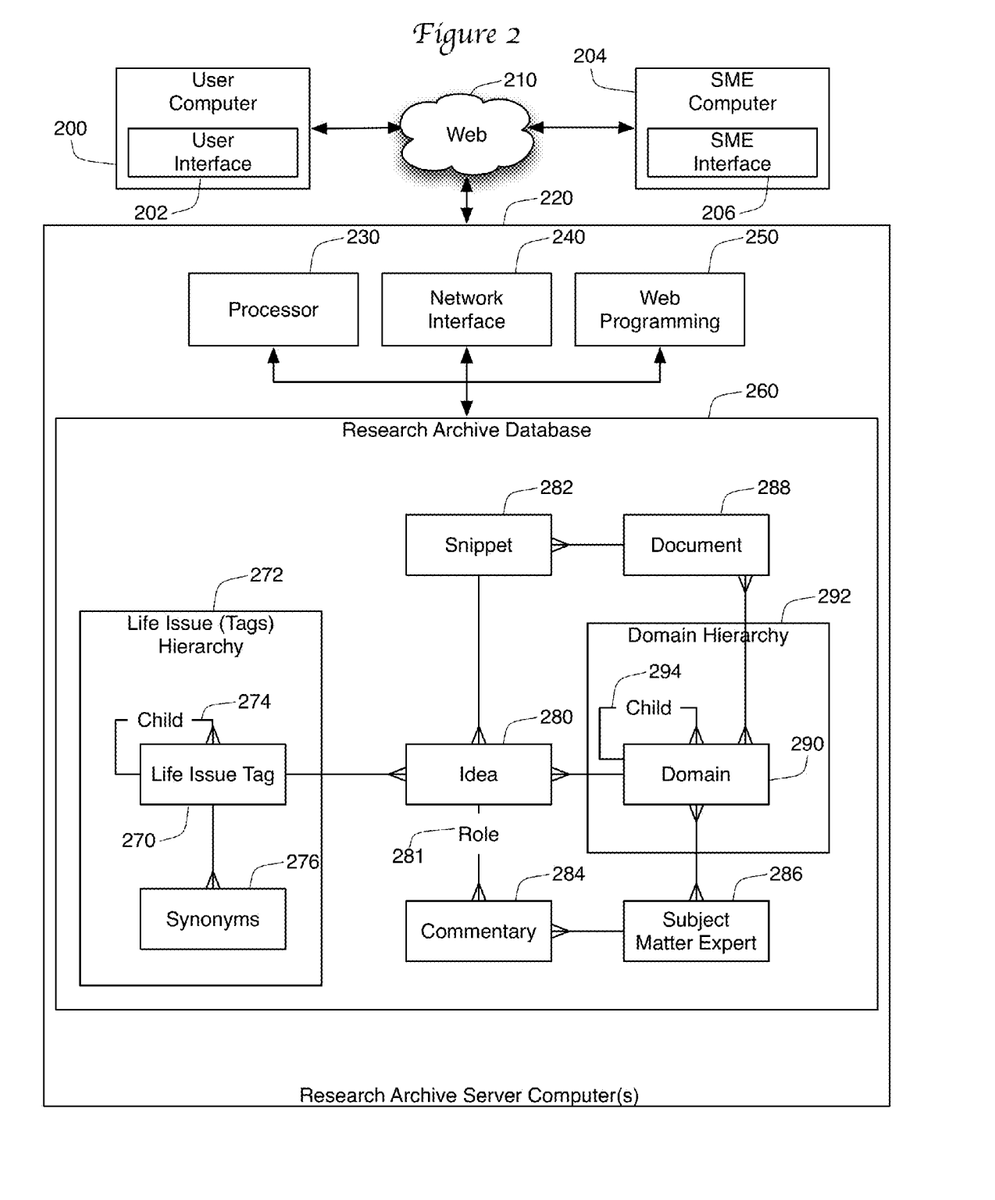
FIG. 2 is a schematic diagram showing the major components of an archive server computer.

The archive server 110 of FIG. 1 can be implemented as one or more web server computers 220 communicating with a user computer 200 and a subject matter expert computer 204 over the World Wide Web 210, as shown in FIG. 2. The archive server computer 220 uses a processor 230, a network interface 240, and web programming 250 to provide web-based interfaces over the web 210. The user interface 202 provides the ability to access the research archive that is stored and managed by the archive server 220. The SME interface 206 provides the ability to alter the research archive to include the subject matter expertise of the expert using the SME interface 206. The research archive is also accessed and used by the spiritual community server 120 and the personal reflections book server 130.

In the preferred embodiment, the archive server computer 220 stores the research archive in a structured database 260. The archive can be maintained as separate tables in a relational database, or as database objects in an object-oriented database environment. The database 260 is stored in the memory of the research archive server computer 220 as data and related database programming. The database programming directs the processor 230 to access, manipulate, update, and report on the data in the database 260 as further described herein. FIG. 2 shows the database 260 with tables or objects for a life issue tags 270, ideas 280, and domains 290. Relationships between the database entities, including entities 270, 280, and 290 are represented in FIG. 2 using crow's foot notation. For example, FIG. 2 shows that a life issue tag 270 may be related to (or "associated with") multiple ideas 280, but each idea 280 is associated with only a single life issue tag 270. Associations or relationships between the database entities shown in FIG. 2 can be implemented through a variety of known database techniques, such as through the use of foreign key fields and associative tables in a relational database model.

Figure 3:
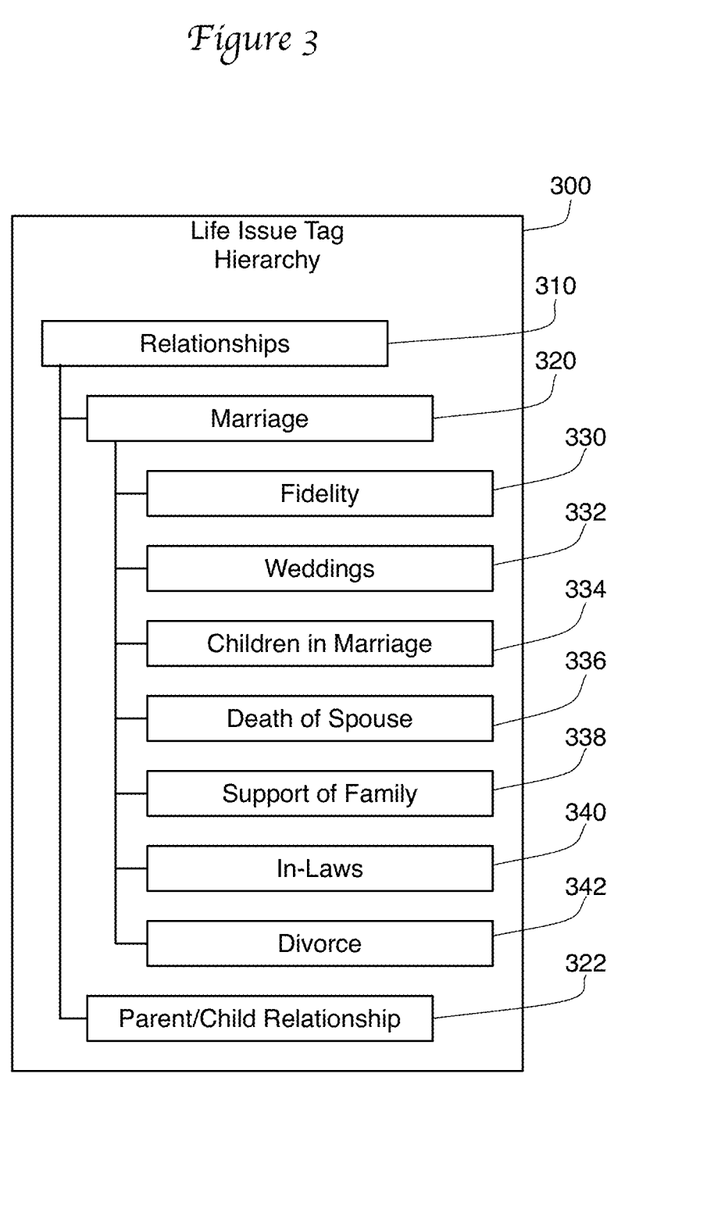
FIG. 3 is a schematic diagram showing a portion of a hierarchy of life issue tags.

The life issue tag database entity 270 contains an identifier and a description for a particular life issue that may face an individual, such as "marriage" or "death of a parent." The life issue tags 270 are organized within a life issue tag hierarchy 272 maintained by the archive database 260. This means that each tag 270 may be assigned one or more child tags 270 through the use of a child relationship 274. It is to be understood that the hierarchy 272 could be created with a parent relationship instead of a child relationship 274, or by using both child 274 and parent relationships. Within the life issue tag hierarchy 272, individual tags 270 may have a parent tag 270, one or more sibling tags 270, and one or more child tags 270. FIG. 3 shows one portion of an example life issue tag hierarchy 300. In this example, tag 310 deals with the life issue of relationships. Two child tags 320, 322 of the relationships tag 310 are shown in FIG. 3, namely the marriage tag 320 and the parent/child relationship tag 322. The marriage tag 320 is itself shown with seven child tags 330-342, namely a fidelity tag 330, a weddings tag 332, a children in marriage tag 334, a death of a spouse tag 336, a support of family tag 338, an in-laws tag 340, and a divorce tag 342. In this hierarchy 300, the marriage tag 320 has one parent tag 310, one sibling tag 322, and seven child tags 330-342. The fidelity tag 330 has one grandparent tag 310, one parent tag 320, and six sibling tags 332-342. The parent 320 and grandparent tag 310 can both be considered ancestor tags of the fidelity tag 330. Similarly, all of the tags assigned reference numerals 320-342 are progeny tags of the relationship tag 310.

In one embodiment, every tag 310-342 has only a single parent tag and therefore is found in only one location in the hierarchy 300. In other embodiments, a single tag 330-342 may have multiple parents and can therefore be duplicated at multiple locations in the hierarchy 300. For example, the death of a spouse tag 336 could be a child tag to the marriage life issue tag 320, and could also be a child tag to a "death" life issue tag (not shown in FIG. 3). In some embodiments, every time a data element is associated with a life issue tag 270 it is automatically associated with the parent of that life issue tag 270, or even all ancestors of that tag 270. This association could be hard coded into the database. Alternatively, this could be accomplishing during data access, where a request for information relating to a parent tag would also automatically retrieve information relating to a child's tag. For instance, a request for information relating to the marriage tag would include information associated with the in-laws tag 340.

Returning to FIG. 2, the research archive database 260 can contain one or more synonym data base entities 276 that are associated with each life issue tag 270. This allows the user interface 202 to accept a key word search for a particular life issue tag 270. The content of the life issue tag entities 270 and the synonym entities 276 can then be searched for occurrences of those key words. If the key words were not found in the title or description of any of the life issue tags 270 but were found in the synonyms 276, the appropriate life issue tags 270 could still be identified by identifying the life issue tags 270 associated with the found synonyms 276. This is described in more detail below in connection with FIG. 6.

Figure 4:
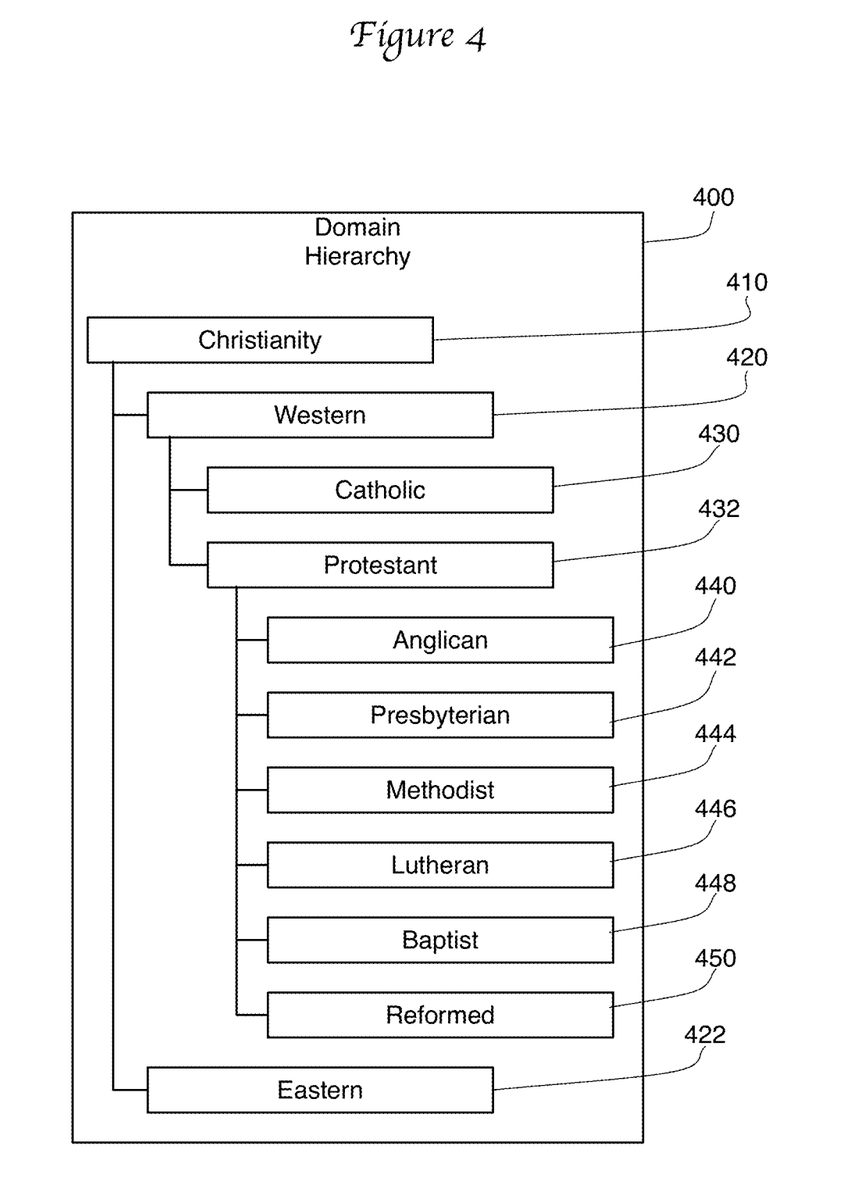
FIG. 4 is a schematic diagram showing a portion of a hierarchy of domains.

The idea database entities 280 each reference a single snippet or quotation 282 from a spiritual text 288 that is considered a foundational document for one of the domains 290 of the archive database 260. The domains 290 are categorizations of spiritual or religious bodies or groups of believers, such as Sufism, Southern Baptist, or Catholic. Domains are identified through the domain database entity 290. As was the case with life issue tags 270, the archive database 260 maintains a hierarchy of domains 292 by assigning a child relationship 294 between one domain and another. FIG. 4 shows one portion of an example domain hierarch 400. The top domain 290 shown in this section of the hierarchy 400 is Christianity 410. This domain 410 has two children, namely western Christianity 420 and eastern Christianity 422. Western Christianity 420 has two child domains 290 in hierarchy 400, namely Catholic 430 and Protestant 432. The Protestant domain 432 itself has six children, namely Anglican 440, Presbyterian 442, Methodist 444, Lutheran 446, Baptist 448, and Reformed 450. Each of these children domains 440-450 could itself be a parent domain 290 for other recognized religious domains 290. As was the case with the life issue tag hierarchy 300, domains 410-450 in the domain hierarchy 400 can have ancestor domains (parents, grandparents, etc.) and progeny domains (children, grandchildren, etc.).

FIG. 2 shows that each domain 290 is associated with a plurality of spiritual documents 288, with the documents 288 that are associated with a single domain 290 constituting the "corpus" for that domain 290. These documents 288 were selected by subject matter experts using interface 206 as a representative group of spiritual documents 288 for that domain 290. Not surprisingly, the documents 288 can be assigned to multiple domains 290, as numerous religious and spiritual domains 290 share spiritual documents 288 with other domains 290. Each snippet 282 is a quotation or an excerpt from a spiritual document 288. Every document 288 can have multiple snippets 282, but every snippet 282 is taken from only one document 288.

Each idea 280 is associated with a single life issue tag 270, with a single domain 290, and with a single snippet 282 that is taken from a document 288 associated with that domain 290. Consequently, although each idea 280 is related to only a single life issue tag 270, snippet 282, and domain 290, multiple ideas 280 can exist for a single life issue tag 270, snippet 282, or domain 290. Each idea 280 is also associated with a set of commentaries 284. These commentaries are written by subject matters experts, each of whom is identified and tracked through a subject matter expert database entity 286. Each subject matter expert is an expert on at least one religious or spiritual domain 290, as indicated by the relationships between database entities 286, 290 shown in FIG. 2. The subject matter experts write the commentaries 284 on the snippet 282 for an idea 280 from the point of view of the idea's domain 290. These commentaries 284 also reflect on how the snippet 282 relates to the life issue tag 270 assigned to that idea 280. Each of the set number of commentaries 284 associated with an idea 280 are written in the context of a particular approach to the related domain 290 as indicated by the role 281 assigned to that commentary 284. For instance, five commentaries 284 on the snippet 282 could be written from the point of view (or role 281) of i) a historical analysis approach within the domain 290, ii) a traditional approach within that domain 290, iii) a moderate approach within the domain 290, iv) a modern approach within the domain 290, and v) a comparative approach comparing the understanding of the associated domain 290 with other domains 290. In the preferred embodiment, all ideas 280 in the archive database 260 contain the same number of commentaries 284 (such as four, five, or six) on the snippet 282, with the commentaries 284 all written from the same four (or five or six) different roles 281. The roles 281 can be implemented in a variety of ways, such as by identifying the role 281 in the database structure that creates the relationship between the idea 280 and the commentary 284. Alternatively, the commentary database entity 284 could contain data identifying its role, or the idea database entity 280 could be constructed to have separate, single relationships defined for each of the possible roles 281.

Figure 5:
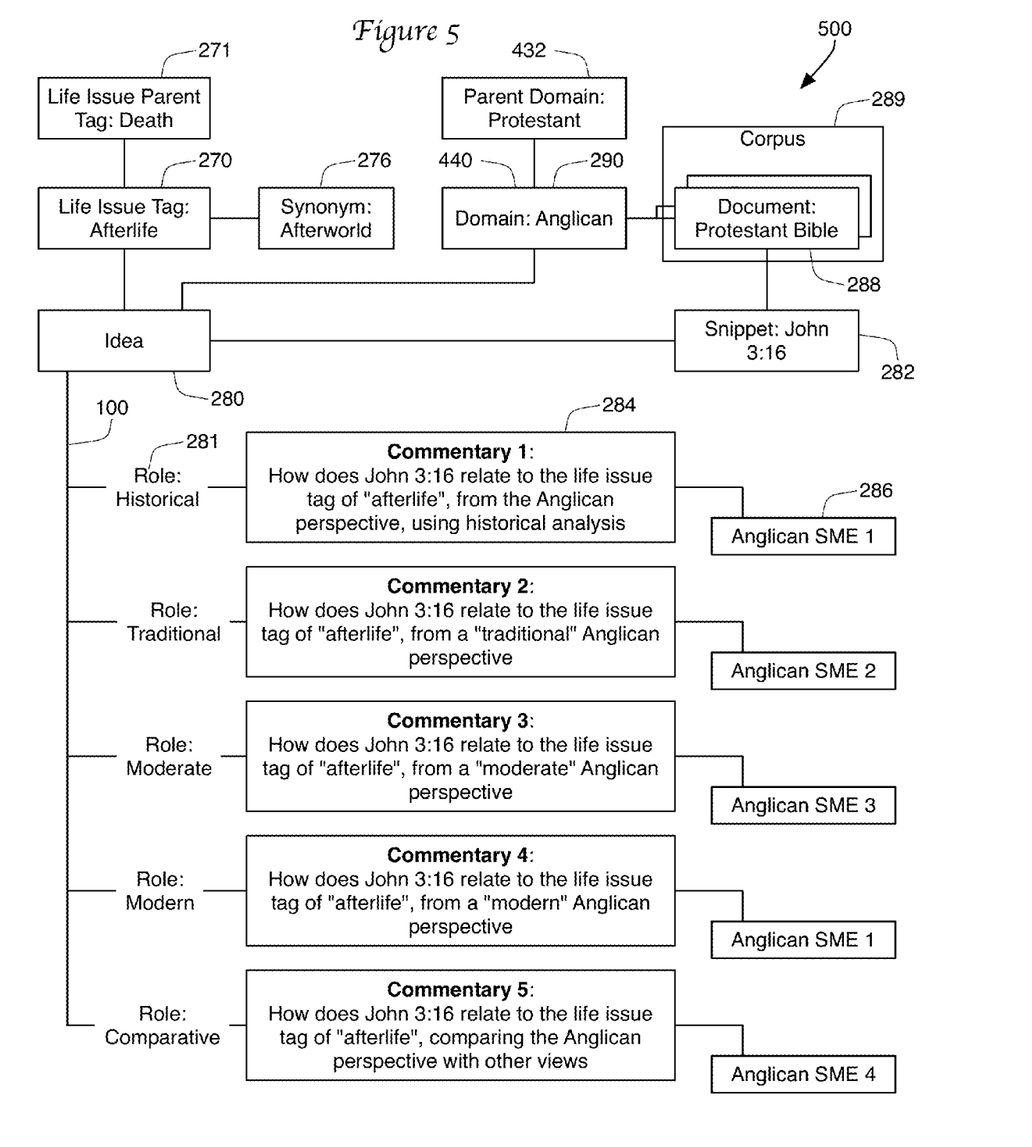
FIG. 5 is a schematic diagram showing an example idea in the context of the related database entities.

FIG. 5 shows some example data 500 in the research archive database 260. In this case, a single idea 280 is diagrammed. This idea 280 is associated with the life issue tag 270 of "afterlife." This life issue tag 270 is in a life issue hierarchy 272, and is shown as a child of the parent tag "death" 271. A synonym 276 has been assigned to the life issue tag 270, in this case allowing searches for the word "afterworld" to be associated with the life issue tag afterlife 270. The idea is also associated with a snippet 282, in this case chapter 3, verse 16 of the Gospel of St. John. This snippet 282 is taken from a document 288, in this case the protestant Bible. This document 288 is associated with a particular domain 290, in this case the Anglican domain 440, which is a child of the Protestant domain 432.

The idea 280 in FIG. 5 contains five commentaries 284 that provide expert commentary on the snippet 282. All of the commentaries 284 are written from the point of view of the Anglican domain 290, and all of the commentaries 284 reflect on how this snippet 282 relates to the life issue 270 of the afterlife. The five commentaries differ in their roles 281, approaching the same question from the five predefined roles: i) an Anglican historical analysis approach, ii) a traditional Anglican approach, iii) a moderate Anglican approach, iv) a modern Anglican approach, and v) a comparative approach comparing the Anglican understanding with other domains 290.

Of course, the table or object entities shown in FIGS. 2-5 should not be considered to show actual implementation details of the database 260, since it is well within the scope of the art to implement this type of data using a variety of entity architectures. The entities shown are exemplary, intended to aid in the understanding of the data maintained by the system database 260 in this embodiment. It is not even necessary to implement these entities as formal tables or objects, as other database paradigms could also effectively implement these types of data structures. Throughout the remainder of this disclosure, the content and interrelationship of database structures will continue to be explored using these example data structures, but these structures should not be considered to limit the way in which these databases can be constructed.

Searching and Displaying of Results

Figure 6:
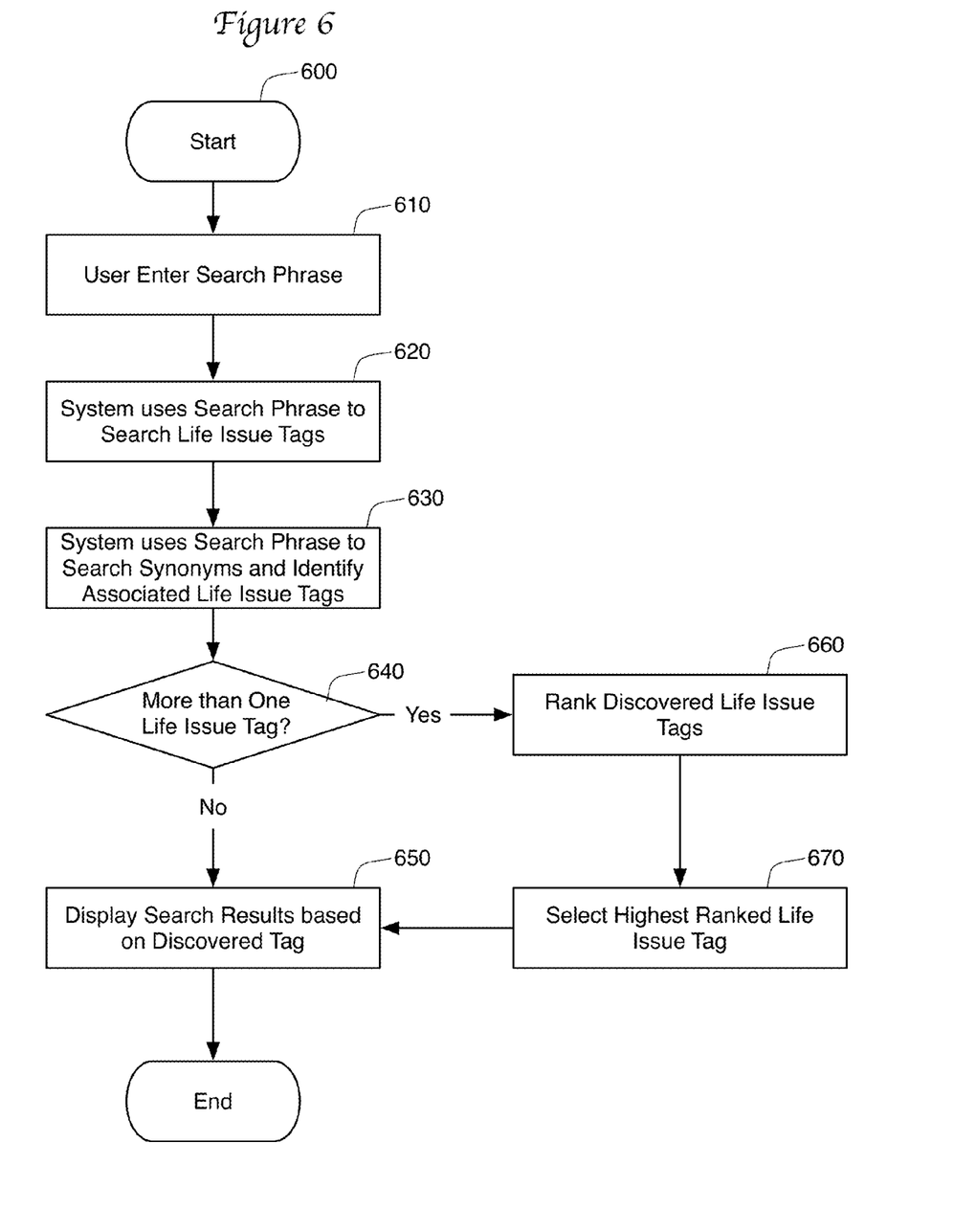
FIG. 6 is a flow chart showing a system of the creation of new synonyms based on user interaction.

One benefit of this construction of the archive database 260 is that it is possible to research the ideas 280 and document snippets 282 by identifying a life issue tag or tags 270 of interest. FIG. 6 shows a process 600 by which a user can enter a search phrase and find related ideas 280, document snippets 282, and commentaries 284, and even if the words used in the search phrase were not found in any of these elements 280, 282, 284. The process 600 starts at step 610 where a user enters a search phrase using the user interface 202 provided by the research archive server computer 220. The server computer 220 then uses the search phrase to identify life issue tag database entities 270. These database entities 270 may contain one or more fields that define a life issue tag, such as a life issue tag name (e.g., "marriage") and a life issue tag description ("this tag relates to issues concerning two people joined together in marriage"). Step 620 can search all fields in the life issue tag database entity 270 for a match to the search phrase.

Figure 7:
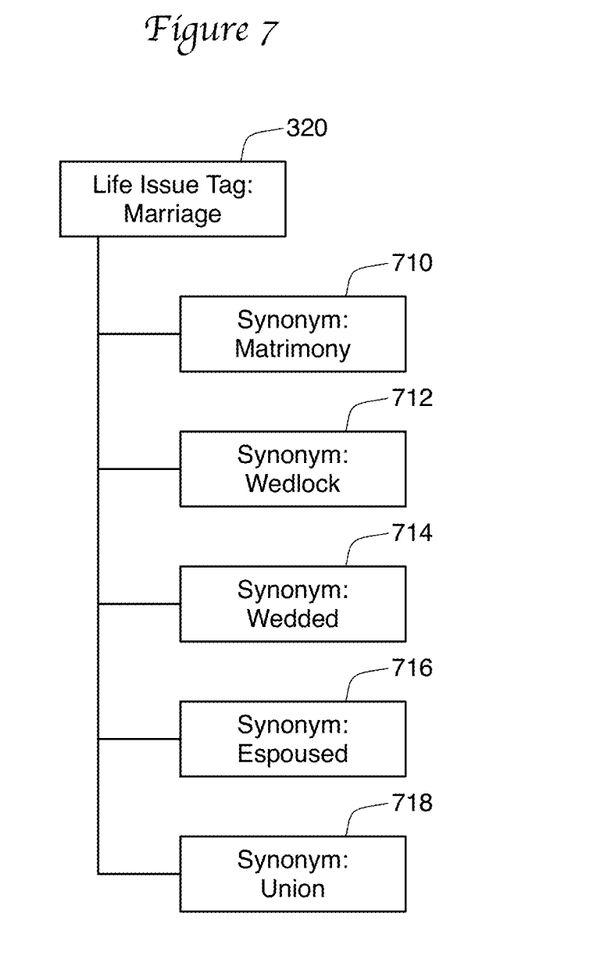
FIG. 7 is a schematic diagram showing related synonyms for a life issue tag along with suggested synonyms to be presented to a subject matter expert.

At step 630, the synonym database entities 276 are then compared to the search phase to find matching synonyms. If a match is found between the search phrase and the synonyms 276, then the related life issue tag 270 is identified for the matching synonym 276. For example, FIG. 7 shows five synonyms 710-718 that have been assigned in the database 260 to the life issue tag of marriage 320. Using these synonyms 710-718, a search phrase that includes any of the words "matrimony," "wedlock," "wedded," "espoused," or "union" would be linked to the life issue tag 320 of "marriage."

Figure 8:
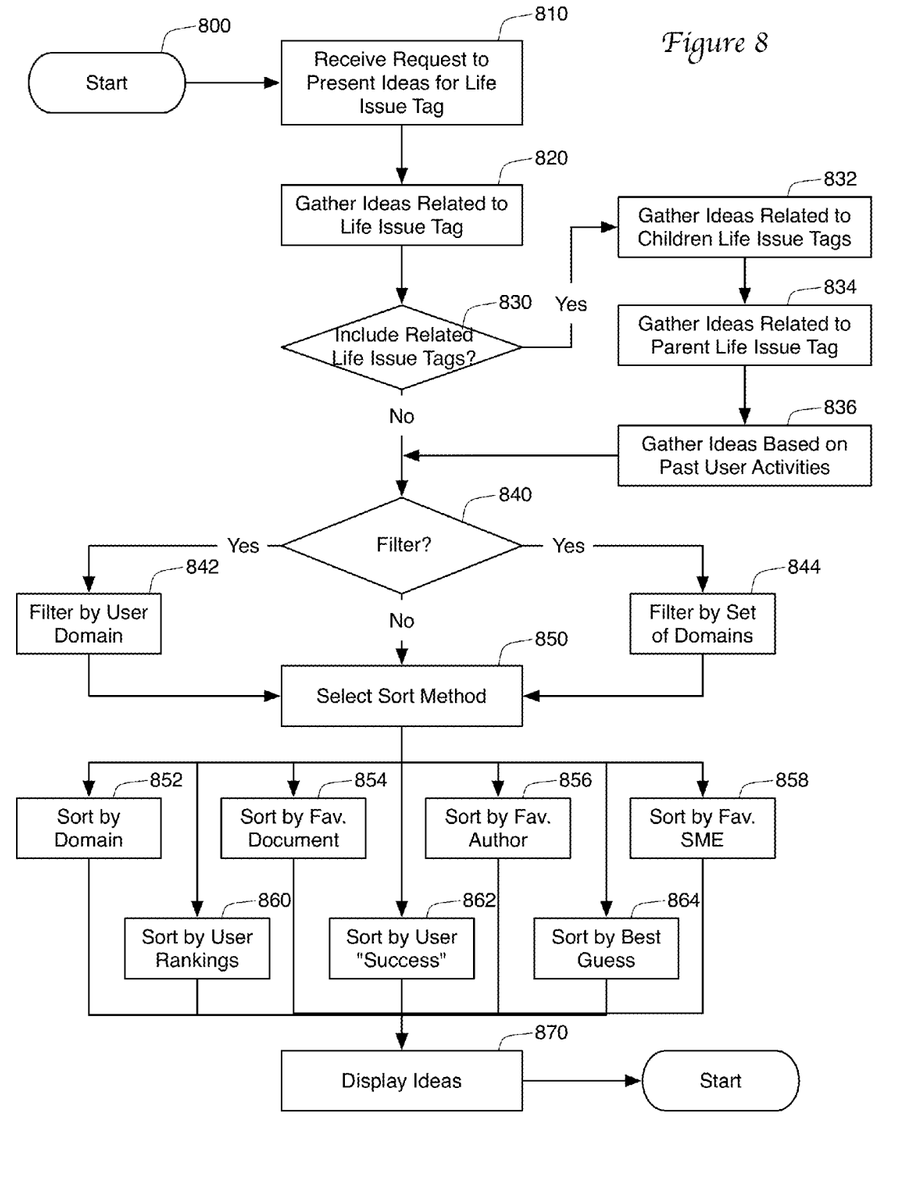
FIG. 8 is a flow chart showing a method of searching for and presenting ideas from a research archive.

At step 640, the total number of life issue tags 270 found through steps 620 and 630 are identified. If only one life issue tag 270 was identified, then the process continues at step 650 where the results for the one discovered life issue tag 270 displayed to the user interface 202. These results include the presentation of the identified life issue tag 270 within its location in the life issue tag hierarchy 272, as well as a listing of idea database entities 280 that are associated with that life issue tag 270. One process 800 for selecting and organizing these idea database entities 280 after a search is shown in FIG. 8 and described below. If more than one life issue tag 270 were identified by the by step 640, it would be possible to simply list all of the identified life issue tags 270 and allow the user to select their desired tag 650. Process 600 operates differently, in that the discovered life issue tags 270 are ranked according to a ranking algorithm at step 660, and then the highest ranked tag 270 in the ranking is identified at step 670 for use in the display step 650. The ranking algorithm used in step 660 can use a variety of ranking algorithms that are known in the prior art. For instance, the tags 270 could simply be ordered in terms of their popularity. Tags 270 that are viewed more frequently than other tags 270 by the users of server computer 220 would be ranked higher than others. More sophisticated algorithms could also be used, such as algorithms that track the activities and behaviors of previous users who have submitted similar search phrases to determine which results have been most useful to users.

FIG. 8 shows a process 800 for gathering, filtering, and sorting idea database entities 280 that are associated with a particular life issue tag 270. Process 800 begins with step 810, in which a request to present ideas 280 for a particular life issue tag 270 is received. This request can come from process 600, which includes a step to display the ideas 280 associated the found life issue tag 270 at element 650. This request can also come from other aspects of the user interface 202, as is described below.

Using the associations (or relationships) established by the database 260 between life issue tags 270 and ideas 280, the process 800 can easily identify those ideas 280 associated with the identified life issue tag 270 in step 820. In some circumstances, it may be helpful to gather additional ideas 280 beyond those that are directly associated with the identified life issue tag 270. If these additional ideas 280 are to be gathered, as determined by step 830, step 832 identifies children life issue tags 270 of the identified life issue tag 270, and then identifies the ideas 280 that are associated with these children tags. Similarly, step 834 identifies parent life issue tags 270 and identifies ideas 280 associated with these parent tags 270. In step 836, the system 100 uses an analysis of past user behaviors in order to predict other life issue tags 270 that may be of interest to a user. For instance, the system may have identified a pattern showing that users that research "marriage", "fidelity," and "divorce," life issue tags also frequently research ideas 280 related to the life issue tags 270 of "anger" and "reconciliation." By analyzing the current user's research behavior, the system 100 may identify these other tags 270 that may be of interest. These system-identified tags 270 can then be used at step 836 to identify additional ideas 280 for presentation to the user.

At step 840, the process 800 determines whether the gathered ideas 280 are to be filtered according to the domains 290 that are assigned to each idea 280. In some circumstances, no filtering will be done and the process 800 continues to the sorting steps 850-864. In other circumstances, a user may have self-identified themselves to the system 100 as a believer or practitioner of a particular spiritual or religious domain 290. If the user desires, their research of the archive database 260 will be limited only those ideas 280 that are associated with the user's chosen domain 290. In this circumstance, step 842 will filter the ideas 280 to include only those associated with the user's domain 290. In other circumstance, multiple domains 290 will be acceptable to a user but the user does not desire all domains 290 to be included in their research. For example, a self-identified Anglican may desire to include ideas associated with child domains 290 of the Anglican domain, which may include an Episcopal Church of the USA domain 290, a Church of England domain 290, an Anglican Church of Australia domain 290, and numerous other domains 290. Step 844 will filter the gathered ideas 280 according to the user selected plurality of domains 290. In some embodiments, ideas 280 associated with child domains 290 are automatically associated with parent domains 290, such that all ideas 280 associated with any Christian domain 290 would be selected if a user elected to view ideas associated with the Christianity domain 290. Step 844 may also be used to filter ideas 280 against multiple, unrelated domains 290. For instance, a self-identified "Anglican" may indicate in their preferences that they also wish to review ideas 280 stemming from two unrelated spiritual disciplines each having their own domain 290.

At this step 850, the process 800 selects one or more sorting methods 852-864 to sort the remaining ideas 280 so as to give preferences to those ideas 280 that are most likely to be of interest to the user. For example, if the user did not filter the ideas 280 by domain 290 but nonetheless indicated a preference for one or more particular domains 290, the ideas 280 could be sorted according to those preferred domains 290 at step 852. These preferences could have been manually set by the user using the user interface 202, or could have been identified by the system 100 by tracking past user behavior. For example, a user that has previously only viewed ideas in the Anglican domain 290 and the New Age Mysticism domain 290 would have the ideas 280 sorted at step 852 so that ideas 280 in those identified domains 290 appear first in the result list presented to the user. In the same way, a user could indicate a preference for a particular document (e.g., the protestant Bible), a favorite author (Martin Luther), or a favorite subject matter expert that writes commentaries 284 for ideas 280, which could cause the process 800 to sort the ideas by that document (step 854), author (step 856), or subject matter expert (step 858). In addition, the system 100 could allow users to rate particular ideas 280, and can then sort the ideas 280 at step 860 in order to present the ideas 280 in order of their user ratings.

At step 862, the system 100 attempts to assign determine whether users searching the archive database 260 have achieved a successful outcome. A successful outcome may mean that the user repeatedly returns to the same idea 280 when researching a life issue tag 270, or that the user quoted content from an idea 280 in contributions that the user made to the spiritual community server 120 or the personal reflections book server 130. However success is measured, the system 100 can identify ideas 280 that have helped users reach a successful outcome, and then sort the resulting ideas 280 according to that success measurement.

Finally, the system 100 can attempt to create a best guess of those ideas 280 that would be most useful to the current user and then present those ideas 280 first in the user interface 202. Step 864 differs from step 862 in that step 862 tried to determine which ideas 280 were most successful to all users, while step 864 attempts to determine the best ideas 280 for the particular user that will view the result. In one embodiment, step 280 first determines relevant life issue tags 270 and domains 280 for a user, either through user-set preferences or by watching user interaction with the system. The system then identifies previous users that shared these life issue tags 270 and domains 280 and determines which ideas 280 were most popular or useful to these previous issues and then sorts the ideas 280 accordingly.

There is no need to use only a single one of these identified sorting techniques 852-864. Multiple techniques 852-864 could be combined to create a primary and secondary sort for the ideas 280. Once the ideas 280 are sorted, the sorted ideas 280 are presented to the user through the user interface 202 at step 870, which is described in more detail in connection with FIG. 9.

Presentation on the User Interface

Figure 9:
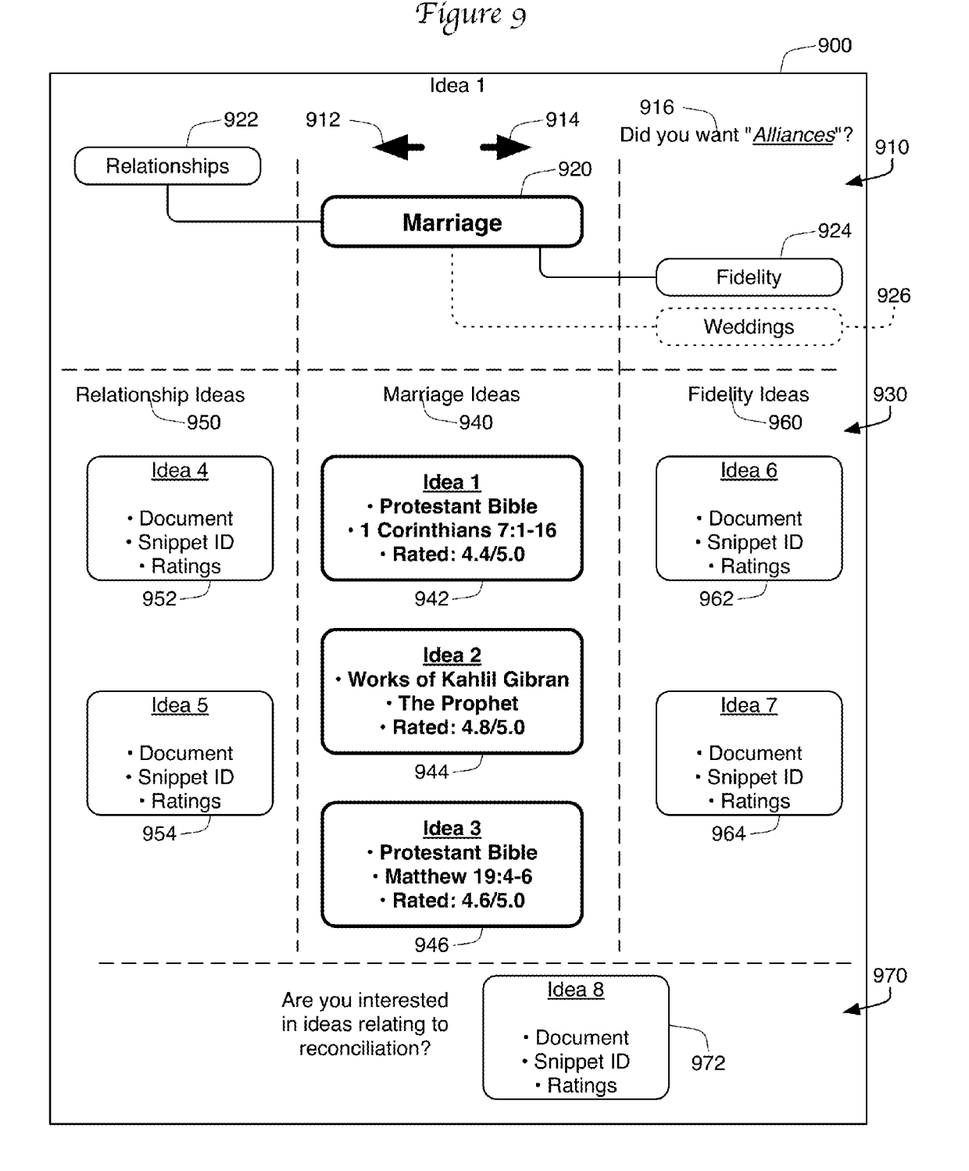
FIG. 9 is a schematic diagram showing a user interface for presenting ideas in response to a search.

In response to a search request by a user, a life issue tag 270 is identified through process 600, and then ideas 280 associated with the identified life issue tag 270 are gathered, filtered, and sorted in process 800, and the results are presented to a user such as through user interface 900 shown in FIG. 9. This interface has three main parts: a life issue hierarchy portion 910 that is responsible for displaying the selected life issue tag 270 in the context of its tag hierarchy 272, a related idea presentation portion 930 that presents sorted ideas 280 that are associated with the selected life issue tag 270 and perhaps related tags 270 in the tag hierarchy 272, and a best guess portion 970 that presents ideas 280 that are not directly related to the presented life issue tag 270 but may be of interest to the user.

The life issue hierarchy portion 910 shows the identified life issue tag 270 from method 600. In this case, the identified tag is the marriage tag 920. In interface 900, this tag 920 is placed in the center of the life issue hierarchy portion 910 and is emphasized such as through the use of bolded or larger text. This emphasis lets the user understand that this interface 900 is centered on the life issue tag of marriage 920. The tag hierarchy portion 910 of interface 900 includes not only the identified tag 920, but also the parent of this tag (the relationships tag 922) and at least one child tag (the fidelity tag 924). In some embodiments, all children tags are shown in the life issue hierarchy portion 910 of the user interface, as is indicated by showing a second child tag (the weddings life issue tag 926) in dotted lines on FIG. 9. In order to show numerous children tags 924, 926 of the selected tag 920, it is sometimes helpful to design the interface 900 such that the tag hierarchy is positioned vertically along the left side of the interface 900 as opposed to horizontally on the top side of the interface 900 as shown in FIG. 9.

By presenting the life issue hierarchy portion 910, a user is able to directly traverse the life issue tag hierarchy 272 starting at the life issue tag 920 selected by their search. In one embodiment, the user simply clicks on the desired life issue tag 270 shown in portion 910 and interface 900 is refreshed with the chosen tag 270 becoming the centered, identified tag 920 of the interface 900. The user can traverse up and down the hierarchy 272 without selecting a particular tag 270 using the arrows 912, 914 included in interface portion 910.

Sometimes a user's search phrase will identify more than one life issue tag 270. As discussed above, method 600 will then rank the tags and select the most likely tag in steps 660 and 670. For example, an individual might have searched on the word "unions." This word was identified as a synonym 718 of the life issue tag "marriage" 320 as shown in FIG. 7. However, it is possible that the same word "union" was also considered a synonym for the life issue tag of "alliances." While method 600 ranked the tags 270 and selected the marriage tag 920 as the preferred tag 270 to display on interface 900, the interface 900 may present the user with the opportunity to select the un-selected tag. This is done with question 916, which allows the user to automatically select the alliances life issue tag 270 and refresh interface 900 around that tag.

The related idea presentation area 930 is shown in FIG. 9 with three columns 940, 950, 960 of ideas. The main column 940 is placed in the center of interface 900 directly underneath the identification of the main life issue tag 920 for interface 900. The ideas 942, 944, 946 in this column 940 are emphasized to let the user know that these ideas 942, 944, 946 relate directly to the marriage life issue tag 920. These ideas 942-946 have been gathered, filtered, and sorted according to process 800. As shown in FIG. 9, these ideas 942, 944, 946 are not presented in their entirety (which would include the text of the snippet 282 and the commentaries 284 on the snippet 282). Rather, the interface 900 in FIG. 9 identifies each idea 942, 944, 946 by disclosing the document 288, a citation or other identifier for the snippet 282, and a user rating for that idea 280. In other embodiments, language from the snippet 282 could be included in FIG. 9 to allow the users to read all or part of the snippet 282 before viewing the entire idea 280.

The first column 950 in the idea presentation area 930 shows ideas 952, 954 that are associated with the parent life issue tag 922 of "relationships." Again, interface 900 merely provides some information about these ideas 952, 954 without displaying the entire idea 280 (including the snippet 292 and the commentaries 284). Because these ideas 952, 954 are not associated with the main life issue tag 920 of the interface 900, these ideas 952, 954 are generally deemphasized when compared with the more central ideas 942, 944, 946 relating to marriage 920. The third column shows ideas 962, 964 associated with one of the children tags, in this case the "fidelity" life issue tag 924. By including columns 950, 960 of ideas 952, 954, 962, 964 of that are not directly related to the central life issue tag 920, the user is able to obtain a broader picture of the ideas 280 that are accessible through related life issue tags 922, 924. This encourages the user to explore the life issue tag hierarchy through hierarchy interface portion 910 by manually traversing the hierarchy 272, which will allow the user to more quickly focus in on the exact life issue tag 270 that they desire.

As explained above in connection with step 836, the system 100 may gather ideas 280 for presentation to the user that are not based on a selected life issue tag 270 and its neighbors in the tag hierarchy 272, but instead are based on its analysis of the behavior of other users that have characteristics similar to the current user. This allows the system to suggest an idea 280 that is associated with a "reconciliation" life issue tag even though the user has only researched the "marriage", "fidelity," and "divorce," life issue tags 270. In interface 900, this best guess idea 972 is presented to the user in interface portion 970. This portion 970 is best separated from the related idea presentation portion 930 so that users do not believe that the idea 972 is connected directly to the identified life issue tag 920.

Figure 10:
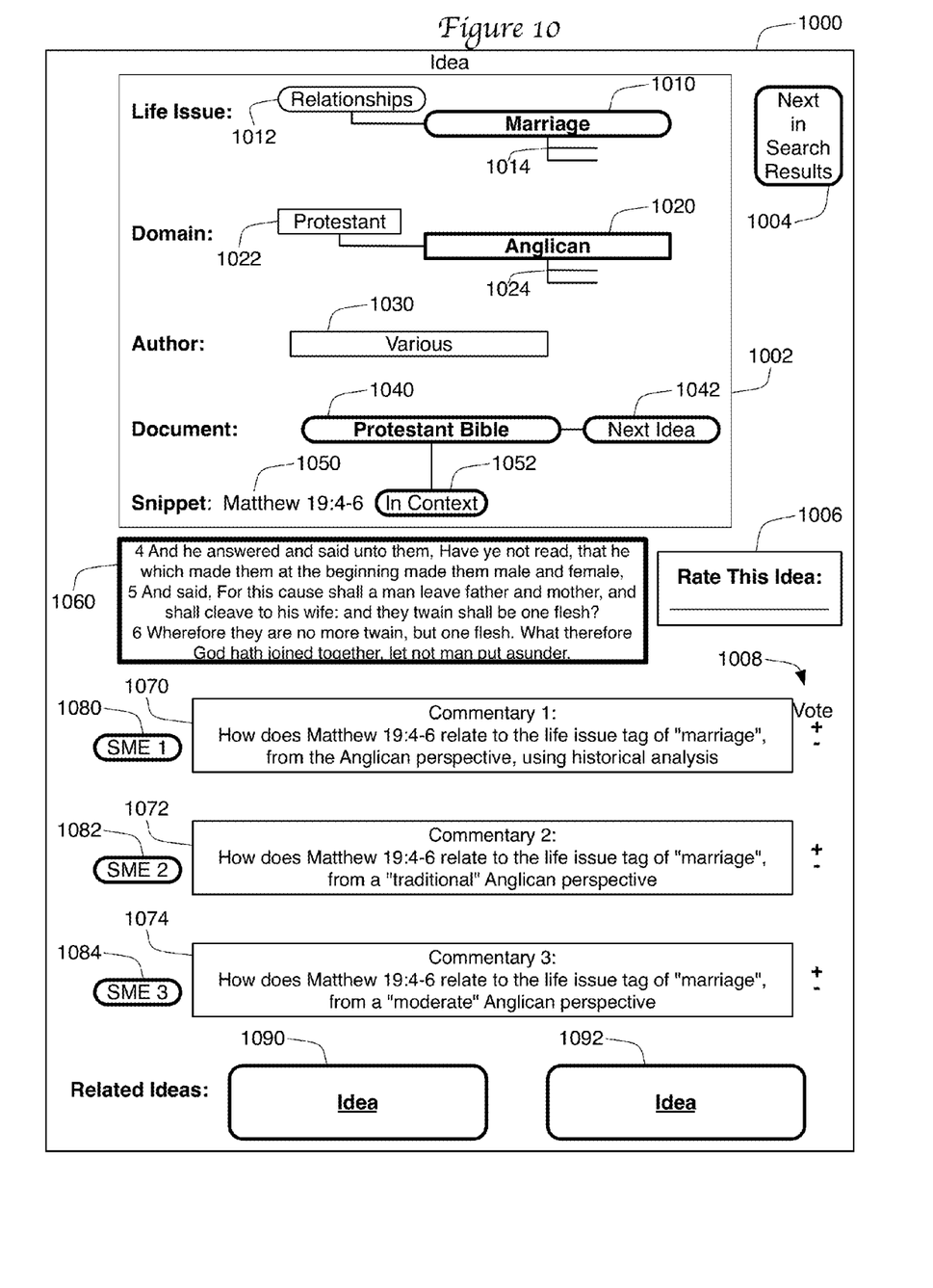
FIG. 10 is a schematic diagram showing a user interface for presenting an idea within its research archive context.

A user may select any of the ideas 942-946, 952-954, 962-964, and 972 for more detailed study in the idea user interface 1000 shown in FIG. 10. This interface 1000 presents both a single idea 280 but also information about the context 1002 of the displayed idea 280, including the life issue tag 270 and domain 290 assigned to the idea 280. In this case, the life issue tag is "marriage" 1010 and the domain is "Anglican" 1020. In some embodiments, the life issue tag 1010 is presented within its context of the life issue tag hierarchy 272, showing the parent tag 1012 ("relationships") and its children tags 1014. Similarly, the domain tag 1020 can also be shown in the context of the domain hierarchy 292 including the parent domain 1022 ("Protestant") and children domains 1024. The context 1002 of the idea 280 also includes an identification of the document 288 from which the snippet 282 was taken. In this case, the document 288 is the Protestant Bible (1040), and the snippet is the Gospel of St. Matthew, Chapter 19, verses 4-6 (1050). Frequently the spiritual documents 288 in the archive database 260 have known authors, so the context information 1002 also identified the author 1030 for the document 1040. The rounded icons shown in the context information 1002 indicate that a user may select these icons and go to related information. For instance, the user can select a life issue tag 1010, 1012, 1014 and go to interface 900 for that life issue tag. Alternatively, the user could select the document icon 1040 and view the entire contents of the document 1040, or select the "in context" icon 1052 and go directly to the location of the idea's snippet 282 within the full text of the document 288. The "next idea" button 1042 allows a user to automatically go to the next idea 280 with the document 1040 for this life issue tag 1010 as analyzed by this domain 1024.

Interface 100 presents the full text of the snippet 1060, and then presents the commentaries 1070-1074 that comment on this snippet 1060 in the context of this life issue 1010 for this domain 1020. As explained above, commentaries 284 are preferably associated with pre-defined roles 281, with each idea 280 containing a similar set of commentaries 284 having the same roles 281. In FIG. 10, only three commentaries 1070-1074 are shown. However, if the database 260 were established with a set number of roles 281, such as four, five, or six, then interface 1000 would present commentaries for all of the set number of roles 281. Each commentary 1070, 1072, 1074 is written by a subject matter expert using interface 206. These SMEs are identified through icons 1080, 1082, and 1084 so that users may identify the expert that writes the commentaries 1070-1074. The icons 1080-1084 themselves can be selectable by the user so that the user can go directly to related ideas that contain commentary by the same subject matter expert. Ideally, these icons 1080-1084 would also identify the subject matter expert, such as by name.

Although interface 1000 is designed to allow users to view a single idea 280, it is possible that the system 100 might suggest additional ideas 270 for study by a user based on their past interests and history using the system 100. These suggested ideas 1090, 1092 could be presented at the bottom of the interface 1000. If selected by a user, the interface 1000 would be refreshed to show the selected idea 1090 or 1092.

Users may view interface 1000 after selecting an idea 280 from the search results interface 900. In that case, an icon 1004 on the idea interface 1000 may allow the user to move easily to the next idea 280 discovered in the search results shown in interface 900. In addition, the user may be allowed to rate the idea 280 at interface element 1006. This user rating would allow the system 100 to rank this idea 280 relative to other ideas as discussed above. Finally, the system may allow users to rate or vote on commentaries 1070-1074 that have been written about a snippet 1060 for an idea 280 through interface element 1008. The votes on commentaries 1070-1074 may alter the order in which the commentaries 1070-1074 appear on interface 1000. Alternatively, a commentary 1070-1074 that consistent received negative votes may be flagged for review and removal by the system 100.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A server computing machine for spiritual research comprising:
   a) a network interface providing data and a user interface to a remote computing device over a computerized network;
   b) a processor that is controlled via programming instructions;
   c) a non-transitory computer readable memory;
   d) database programming stored on the non-transitory computer readable memory and performed by the processor, the database programming managing an archive database that is transformed during operation by the database programming, the archive database having:
      i) a plurality of life issue tag database entities each having a life issue tag that identifies a life issue,
      ii) a plurality of idea database entities each identifying an excerpt from a spiritual document and at least one commentary about that excerpt, wherein a first idea database entity has a first document excerpt from a first spiritual document and further wherein a second idea database entity has a second document excerpt from a second spiritual document,
      iii) first database relationships between the idea database entities and the life issue tag database entities wherein the first database relationships establish an association between each idea database entity and a single life issue tag database entity, and further wherein all commentaries identified by an associated idea database entity concern the life issue identified in the single life issue tag,
- iv) a plurality of commentary database entities each containing a commentary, and
- v) second database relationships between the idea database entities and the commentary database entities; wherein each idea database entity identifies the at least one commentary through the second database relationship with at least one commentary database entity,
- vi) a plurality of subject matter expert database entities each identifying a subject matter expert, and
- vii) third database relationships between the commentary database entities and the subject matter expert database entities, wherein each of the third database relationships establishes a subject matter expert author for the commentary in the associated commentary database entity; and e) user interface programming stored on the non-transitory computer readable memory and performed by the processor, the user interface programming providing a user interface to remote user devices over the network interface across a wide area network, the user interface providing to an identified user access to the archive database by:
- i) selecting a life issue tag, and
- ii) presenting over the user interface data associated with the idea database entities that are in turn associated with the selected life issue tag, wherein both the first and second idea database entities are associated with the selected life issue tag and are both presented in response to selecting the life issue tag.

2. The server computing machine of claim 1, wherein the server computing machine comprises a plurality of separate physical devices with separate processors, separate network interfaces, and separate non-transitory computer readable memories, the separate physical devices acting in concert as a single server computing machine according to the programming instructions.

3. The server computing machine of claim 1, wherein the archive database further comprises:
- viii) a plurality of synonym database entities each identifying a synonym for a selected life issue tag, and
- ix) second database relationships between each synonym database entity and a selected life issue tag database entity that identifies the selected life issue tag.

4. The server computing machine of claim 1, wherein the archive database further comprises:
- viii) a plurality of domain database entities each identifying a spiritual domain, and
- ix) fourth database relationships between the idea database entities and the domain database entities;
- wherein each commentary in the commentary database entities comments about the excerpt identified by its associated idea database entity not only in the context of the associated life issue tag database entity for that idea database entity but also in the context of the associated spiritual domain for that idea database entity.

5. The server computing machine of claim 4, wherein the archive database further comprises:
- x) a plurality of snippet database entities each having a snippet from a spiritual document, and
- xi) fifth database relationships between the idea database entities and the snippet database entities;

wherein each fifth database relationship identifies the excerpt for each idea database entity by associating the idea database entity with the snippet database entity having the excerpt as the snippet for that single snippet database entity.

6. The server computing machine of claim 5, wherein the archive database further comprises:
- xii) a plurality of document database entities each identifying a complete spiritual document, and
- xiii) sixth database relationships between the snippet database entities and the document database entities;
- wherein each sixth database relationship identifies a source spiritual document in the document database entity for the snippet in each snippet database entity.

7. The server computing machine of claim 6, wherein the archive database further comprises seventh database relationships between the domain database entities and the document database entities, wherein all of document database entities associated with one domain together comprise a corpus of spiritual documents for the one domain.

8. The server computing machine of claim 7, wherein the plurality of life issue tag database entities are organized in a life issue tag hierarchy with ancestor and progeny entities, further wherein a particular first database relationship between a particular idea database entity and a particular life issue tag database entity also establishes a relationship between the particular idea database entity and all ancestors of the particular life issue tag database entity.

9. The server computing machine of claim 8, wherein the plurality of domain database entities are organized in a domain tag hierarchy with ancestor and progeny entities, further wherein a particular fourth database relationship between the particular idea database entity and a particular domain tag database entity also establishes a relationship between the particular idea database entity and all ancestors of the particular domain database entity.

10. The server computing machine of claim 9, wherein each of the second database relationships indicates a role, wherein each commentary in the commentary database entities comments about the excerpt in its associated idea database entity not only in the context of the associated life issue tag database entity for that idea database entity and not only in the context of the associated spiritual domain for that idea database entity, but also in the context of the role indicated in the second database relationship.

11. The server computing machine of claim 1, wherein the user interface selects the selected life issue tag by allowing the identified user to traverse a hierarchy of life issue tags through the user interface and select the selected life issue tag from the hierarchy.

12. The server computing machine of claim 11, wherein the user interface selects the selected life issue tag by:
- i) accepting a search request from the identified user, and
- ii) identifying life issue tag database entities by comparing the search request to the life issue tags and to synonyms associated with the life issue tags.

13. The server computing machine of claim 12, further comprising:
- f) analysis programming stored on the non-transitory computer readable memory and performed by the processor, the analysis programming directing the processor to:
  - i) monitor actions of a plurality of users through the user interface relating to interaction with the database programming,
  - ii) record the monitored actions of the users, and
  - iii) analyze the monitored actions;

wherein data from additional idea database entities are displayed after the search request from the identified user, wherein the additional idea database entities are not associated with the selected life issue tag database entities, wherein the additional idea database entities are identified using the analysis of the monitored actions.

14. The server computing machine of claim 1, wherein the plurality of life issue tag database entities are organized in a life issue tag hierarchy with ancestor and progeny entities, further wherein a particular first database relationship between a particular idea database entity and a particular life issue tag database entity also establishes a relationship between the particular idea database entity and all ancestors of the particular life issue tag database entity.

15. The server of claim 14, wherein the user interface provided by the user interface programming presents a parent and a child life issue tag for the selected life issue tag, further wherein the user interface programming presents over the user interface data from a parent idea associated with the parent life issue tag and data from a child idea associated with the child life issue tag.

* * * * *